Patented Sept. 12, 1939

2,172,417

UNITED STATES PATENT OFFICE 2,172,417

WASHING FOOD WITH REFRIGERANT

Robert B. Taylor, near Knoxville, Tenn., assignor to Tennessee Valley Authority, Wilson Dam, Ala., a corporation of the United States No Drawing. Application July 7, 1938,
Serial No. 217,972

4 Claims. (Cl. 99—198)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the freezing of foods and is particularly directed to an improvement in the rapid freezing of fruits and vegetables by direct contact with refrigerant solution maintained at a temperature substantially below the freezing point of the food.

An object of the invention is to improve the appearance of fruits and vegetables frozen by direct contact with refrigerant solution.

A further object of the invention is to eliminate losses of refrigerant solution and to improve the efficiency of operation in processes for the freezing of fruits and vegetables by direct contact with a refrigerant solution.

Other objects and advantages of the invention will appear from the following description.

It has previously been proposed to freeze foods, including fruits, meats and vegetables, by direct contact with a liquid refrigerant medium. I have described in application Serial No. 91,442, filed July 18, 1936, a particularly efficient and successful method for the quick freezing of foods which comprises directly contacting the food, preferably in the form of units having at least one dimension which does not exceed about one inch, with an aqueous solution which has a freezing point not higher than 0° F. and low viscosities at 0° to 10° F. and which is suitable for use in direct contact with foods, maintaining the temperature of the solution between the temperature at which the food may be safely stored and a temperature substantially below the freezing point of the food, and circulating the solution over the food at such a rate that the temperature of the solution adjacent the food remains below the freezing point of the food. Particularly advantageous refrigerant solutions are provided by aqueous solutions of invert sugar which may, in general, be used for the freezing of both fruits and vegetables. Aqueous solutions of salts, particularly sodium chloride, may also be used, especially for the freezing of vegetables.

In order to remove the dirt and dust which naturally contaminates the surface of fruits and vegetables, it has been found necessary to subject them to a washing operation. Water has always been used for this purpose heretofore and the fruit or vegetable to be frozen has been subjected to a more or less intensive scrubbing or rinsing in water to remove naturally accumulated dirt.

The washing of the fruit or vegetable with water, however, has been found to involve substantial disadvantages. The soaking of the fruit or vegetable in water tends to soften the outer surface of the food, and either by absorption of water into the outer layers of the fruit or vegetable or by the leaching of soluble portions of the food juices out of the outer layers, or by both processes, the condition of the cell content of the outer layers of the food is altered. This effect, which occurs to a greater or less degree with all fruit and vegetables suitable for preservation by freezing, is an inevitable consequence of the fact that contact with water tends to initiate an osmotic exchange process through the cell walls. This osmotic interchange alters the natural turgidity of the cells and decreases their resistance to handling so that the fruit or vegetable after washing with water tends to bruise by contact with handling apparatus or by abrasion among the units of the fruit or vegetable being handled.

A further disadvantage arising from washing fruits and vegetables with water prior to freezing them by contact with a refrigerant solution arises out of the dilution of the solution with water adhering to the food when it is contacted with the refrigerant solution. This results in the rapid decrease in concentration of the solutions so that they require frequent and expensive reconcentration. If reconcentration is effected by the addition of solute to the diluted solution, the solution continually increases in volume and portions must be discarded in order to maintain the volume within the capacity of the freezing apparatus. If reconcentration is effected by boiling there is required not only power for evaporation, but an increased load is thrown upon the refrigerating apparatus to recool the concentrated solution to the temperatures required for the freezing operation.

I have found that these disadvantages may be substantially eliminated by washing the fruit or vegetable solely with solution used as a refrigerant medium. By this method dilution of the refrigerant solution is entirely avoided, except for such dilution as may be caused by fruit juices which may be present due to injury in handling, and the appearance of the frozen fruit or vegetable is greatly improved.

The fruit or vegetable may be subjected to a separate washing operation prior to the freezing operation by using the refrigerant solution in any of the usual washing devices or methods, or the washing and freezing operations may be combined by subjecting the fruit or vegetable to sufficiently rapid motion relative to the cold refrigerant solution to effect removal of the adherent dirt. This may be effectively accomplished by subjecting the fruit or vegetable in the freezing apparatus to the action of a rapidly moving stream or streams of the refrigerant solution at a temperature below the freezing point of the food.

Since the type of dirt naturally occurring on fruits and vegetables is almost entirely insoluble in aqueous solutions suitable for use in direct contact with foods, the dirt removed by the solutions can be eliminated therefrom by subjecting the solution intermittently, or preferably continuously, to a settling or filtering operation. It has been found that such a solution may be used for washing fruits and vegetables for long periods of time without the accumulation therein of noticeable amounts of impurities not removable by settling, filtration or application of centrifugal force.

It will be seen that I have provided an improvement in processes for freezing fruits and vegetables by direct contact with refrigerant solutions, whereby the appearance of the frozen food is improved and dilution of the solution is prevented, which comprises washing the fruits and vegetables solely with the solution used in the freezing operation.

I claim:

1. In the freezing of fruits and vegetables by direct contact thereof with a refrigerant solution, the improvement which comprises washing the previously unwashed food solely with the refrigerant solution used in the freezing operation.

2. In the freezing of fruits and vegetables by direct contact thereof with a refrigerant solution, the improvement which comprises washing the previously unwashed food solely by subjecting the food to the action of a stream of the refrigerant solution, maintained at a temperature below the freezing point of the food, at a velocity effective to remove substantially all of the dirt from the surface of the food.

3. In the freezing of fruits and vegetables by direct contact thereof with a solution of invert sugar having a freezing point below the freezing point of the food, the improvement which comprises washing the previously unwashed food solely with a solution of invert sugar.

4. In the freezing of fruits and vegetables by direct contact thereof with a solution of invert sugar having a freezing point below the freezing point of the food, the improvement which comprises washing the previously unwashed food solely by subjecting the food to the action of a stream of invert sugar solution, maintained at a temperature below the freezing point of the food, at a velocity effective to remove substantially all of the dirt from the surface of the food.

ROBERT B. TAYLOR.